July 18, 1950 T. R. GARDINER 2,515,704
CASTER WHEEL MOUNTING FOR LAND VEHICLES AND AIRCRAFT
Filed Sept. 23, 1946
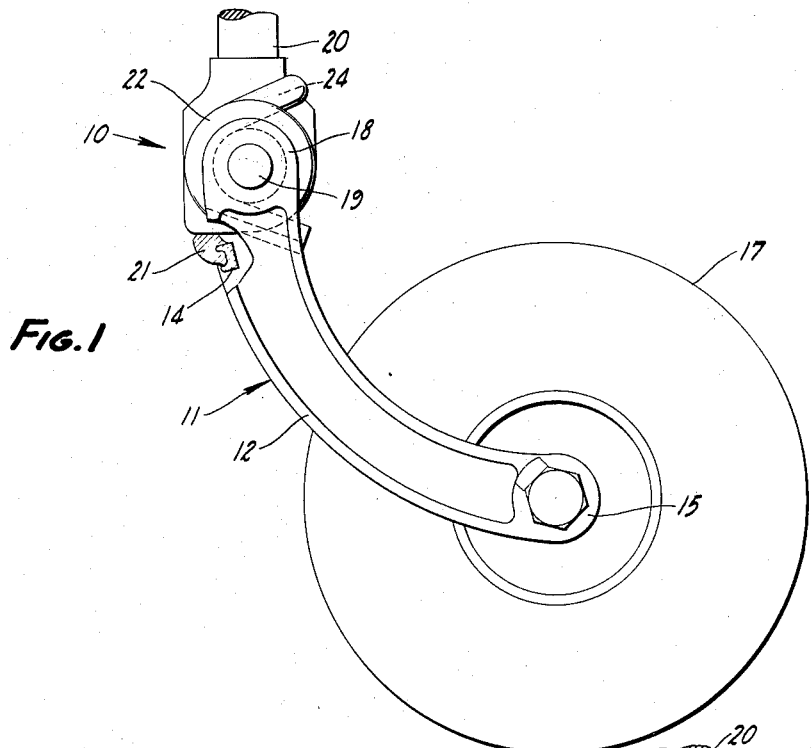
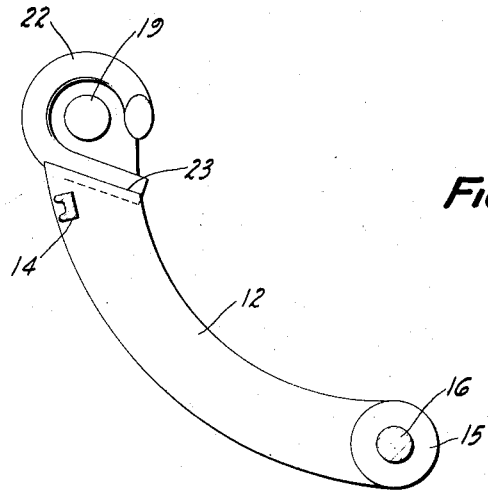
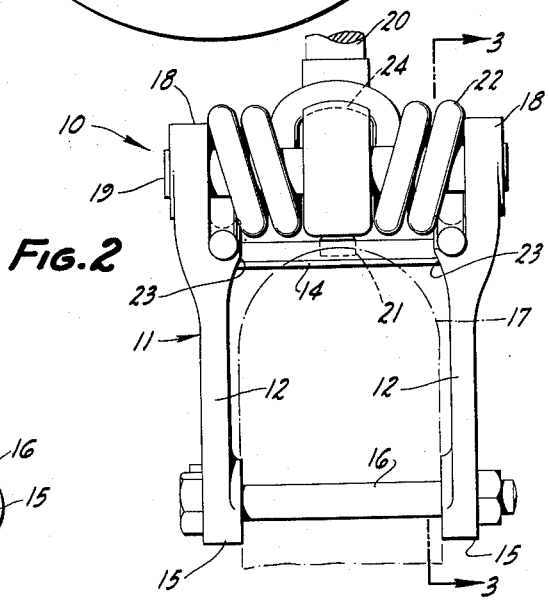
INVENTOR.
Thomas R. Gardiner
BY
Mellin & Hanscom
ATTORNEYS Patented July 18, 1950

2,515,704

UNITED STATES PATENT OFFICE 2,515,704

CASTER WHEEL MOUNTING FOR LAND VEHICLES AND AIRCRAFT

Thomas R. Gardiner, Oakland, Calif.

Application September 23, 1946, Serial No. 698,640

2 Claims. (Cl. 16—44)

This invention relates to caster wheel mountings for land vehicles and aircraft.

It is the principal object of my present invention to provide a generally improved caster wheel mounting for land vehicles and aircraft which is so constructed that shocks imparted to the caster wheel will be resiliently resisted and absorbed by a torsion spring so that they may not be transmitted to the vehicle on which the caster wheel is mounted.

In practicing my invention, I provide a spindle which is rotatably mounted on the vehicle or aircraft running gear, but which is held from axial movement. A caster wheel carrying yoke is pivotally connected to the spindle on an axis perpendicular to the axis of rotation of the spindle. A torsion spring is provided which is connected or engaged with the spindle and yoke so that shocks imparted to the caster wheel tending to swing the yoke about its pivotal axis will tend to increase the torsion of the spring. Thus, the latter will resiliently resist such movement of the yoke and absorb the shock.

One form which the invention may assume is exemplified in the following description and illustrated by way of example in the accompanying drawings, in which:

Fig. 1 is a side elevation of a caster wheel mounting embodying the preferred form of my invention, with parts broken away and in section to more clearly disclose certain details of construction.

Fig. 2 is an end elevation of the caster wheel mounting disclosed in Fig. 1.

Fig. 3 is a vertical sectional view taken on line 3—3 of Fig. 2, disclosing the construction of the inner face of one of the arms of the caster wheel yoke.

Referring more particularly to the accompanying drawings, 10 indicates a caster wheel mounting embodying the preferred form of my invention. My caster wheel mounting is primarily intended for use on ground vehicles and aircraft, but I am aware, of course, that it has other applications. The caster wheel mounting here disclosed includes a caster wheel yoke or fork 11 formed with two spaced parallel yoke arms 12, which are rigidly connected together by a transverse member 14 welded or otherwise secured at its ends to the opposite arms 12, as most clearly illustrated in Figs. 1 and 3.

The yoke arms 12 are formed with bearings 15 for the reception of an axle 16 of a caster wheel 17. The latter is, of course, mounted between the arms 12 and rotatable with respect thereto, as illustrated. The yoke arms 12 are formed at their opposite ends with bearings 18 mounted on opposite ends of an elongated rocker pin 19. The axes of the rocker pin 19 and the wheel 17 are in parallelism, as illustrated.

The caster wheel mounting also includes a vertical spindle 20 which is adapted to be connected with the vehicle or aircraft. It is intended that this spindle 20 be held in a fixed position against axial movement with respect to the vehicle or aircraft running gear, but capable of rotation. The axis of the spindle 20 and the axis of the rocker pin 19 are relatively perpendicular but intersecting, as illustrated.

The yoke arms 12 are curved so that the axis of the caster wheel 17 will be spaced both vertically and horizontally from the axis of the rocker pin 19, so that the wheel may oscillate vertically about the axis of the rocker pin 19 as well as revolve about the axis of the spindle 20. It is by this medium that a proper caster effect is obtained.

The downward swinging movement of the yoke 11 is limited to the position illustrated in Fig. 1 of the drawings by means of a stop member 21 fixed on the transverse member 14, which is adapted to abut against the lower end of the spindle 20 when the yoke arms reach their lowermost position, as shown in Fig. 1. The upward swinging movement of the yoke 11 and its arms 12, however, is resiliently resisted by a torsion spring 22 mounted on the hinge pin 19 and engaging both the arms 12 of the yoke 11 and the spindle 20, as shown.

The opposite ends of the spring 22 are oppositely coiled, as illustrated, to in effect provide two springs formed of a single length of spring material. The terminal ends of each coil of the spring member 22 project substantially in the direction of the yoke arms 12, being slightly inclined downwardly, and are nested in saddles 23 formed on the inner faces of the yoke arms 12. The section of the spring member 22 between the two separate coils thereof is formed in the shape of a bail, which bail extends laterally in the same direction as the terminals of the spring, but which is slightly upwardly inclined to engage a complemental socket 24 formed in one side of the spindle 20.

Thus, any upward movement of the caster wheel 17 and upward swinging movement of the yoke 11 will be resiliently resisted by the spring member 22 in that such movement will tend to increase the torsion of the spring member 22. Consequently, road or other sudden shocks imparted to the caster wheel will be absorbed to a considerable measure by the spring member 22 and will not be transmitted through the spindle 20 to the running gear of the vehicle or aircraft.

Thus, it is seen that the caster wheel yoke may revolve about the vertical axis of the yoke spindle 20 and may oscillate to a limited degree about the horizontal axis of the rocker pin 19. Due to the provision of the spring member 22, the upward movement of the caster wheel caused by unevenness of surface or sudden load thrusts will be resiliently resisted by the spring member 22 which, of course, will act to absorb any sudden shocks imparted to the caster wheel 17. Movement of the yoke and caster wheel in a downward direction is, of course, limited by engagement of the stop 21 with the underside or end of the yoke spindle 20.

From the foregoing it is obvious that I have provided an improved caster wheel structure in which road shocks and sudden load thrusts imparted to the caster wheel in one direction will be resiliently resisted and absorbed by the torsion spring member 22 forming a part of the "knee action" connection between the yoke 11 and the spindle 20.

I desire to point out here that the spring member 22 is put under initial torsion during assembly for proper operating effect.

Thus, it is manifest that I have provided an improved caster wheel mounting for load vehicles and aircraft, and while I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A caster wheel structure comprising a spindle, a pin mounted at its mid portion at the lower end of the spindle with its axis perpendicular to the axis of the spindle, a pair of arms mounted on and depending from opposite ends of the pin, said arms being rotatable relatively to the spindle about the axis of said pin, a wheel rotatably mounted between and at the lower ends of said arms, and a torsion spring coiled about said pin on both sides of the spindle with its mid portion in firm engagement with the spindle and with its ends engaging said arms.

2. A caster wheel structure comprising a spindle, a pin mounted at its mid portion at the lower end of the spindle with its axis perpendicular to that of the spindle, a pair of arms disposed on opposite sides of the spindle and each rotatably mounted on and depending from an end of the pin, said spindle being formed at its lower end with an upwardly facing socket disposed above the pin and each arm being formed on its inner surface and at its upper end but below said pin with an upwardly facing socket, means rigidly connecting said arms, a wheel rotatably mounted between and at the lower ends of the arms, and a single torsion spring having a U-shaped mid portion seated in said first mentioned socket, oppositely wound coils wrapped about said pin on opposite sides of the spindle, and its ends seated in said second-mentioned sockets.

THOMAS R. GARDINER.

REFERENCES CITED

The following references are of record in the file of this patent:

UNITED STATES PATENTS

| Number | Name | Date |
|---|---|---|
| 1,731,640 | Thurlby et al. | Oct. 15, 1929 |
| 2,033,298 | Pribil | Mar. 10, 1936 |

FOREIGN PATENTS

| Number | Country | Date |
|---|---|---|
| 151,918 | Switzerland | Jan. 15, 1932 |
| 176,883 | Switzerland | July 16, 1935 |
| 434,161 | Great Britain | Aug. 27, 1935 |